Mar. 27, 1923.

P. B. WESSON.
SAFETY FAUCET.
FILED JULY 12, 1921.

1,449,472.

Paul B. Wesson,
INVENTOR.

BY

Frank A. Cutter,
ATTORNEY.

Patented Mar. 27, 1923.

1,449,472

UNITED STATES PATENT OFFICE.

PAUL B. WESSON, OF SPRINGFIELD, MASSACHUSETTS, ASSIGNOR TO HAMPDEN BRASS COMPANY, OF SPRINGFIELD, MASSACHUSETTS, A CORPORATION OF MASSACHUSETTS.

SAFETY FAUCET.

Application filed July 12, 1921. Serial No. 484,247.

*To all whom it may concern:*

Be it known that I, PAUL B. WESSON, a citizen of the United States of America, and a resident of Springfield, in the county of Hampden and State of Massachusetts, have invented a new and useful Safety Faucet, of which the following is a specification.

My invention relates to improvements in safety or relief faucets or cocks, it being understood that the term faucet as herein used includes cocks, and said invention resides in a certain peculiar, spring-pressed, auxiliary valve, and the parts with which said valve is associated and cooperates, in the combination of the same with a valve of any ordinary and usual construction, and the parts with which said last-named valve is associated and cooperates, all as hereinafter set forth.

This faucet is adapted to be used in the ordinary manner for the discharge of water from a hot-water boiler or tank, but is provided with automatic means whereby relief is afforded in the event the pressure in such tank becomes excessive.

The primary object of my invention is to provide a relief or safety faucet for use in connection with a hot-water boiler or tank, which faucet is comparatively simple and inexpensive in construction, and can be operated manually in the customary manner for the purpose of drawing water from the tank, yet is adapted to open automatically, under an excessive or at a predetermined pressure, and when the main valve is closed, to permit the water to flow through and escape and thus prevent explosion of or injury to said tank.

Another object is to produce a faucet of this character which comprises but few parts, and is not liable to stick, clog, or otherwise get out of order.

In my faucet the safety or relief elements are separate and apart from the regular valve elements, so that the latter can be constructed in the usual manner and operated with the same facility as formerly.

Other objects and advantages will appear in the course of the following description.

I attain the objects and secure the advantages of my invention by the means illustrated in the accompanying drawings, in which—

Figure 1:
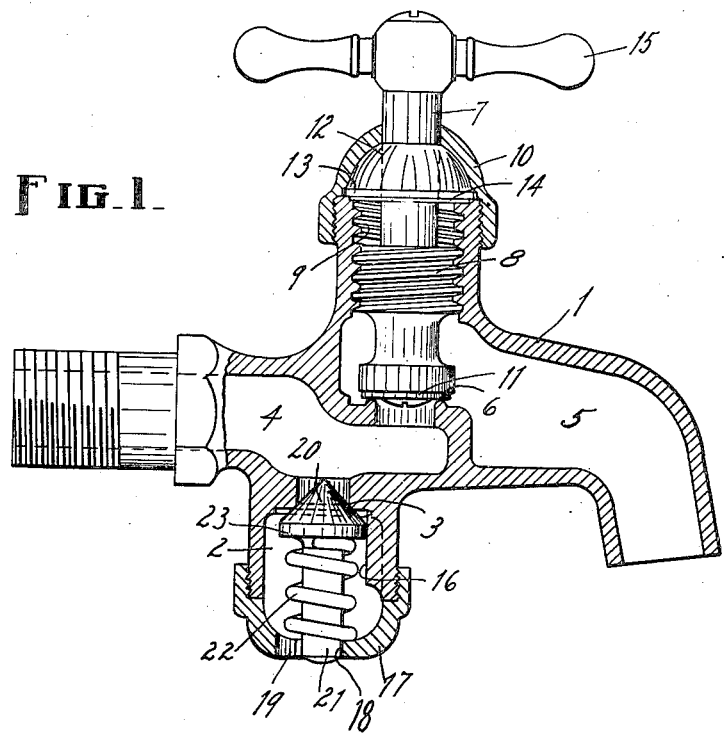
Figure 2:
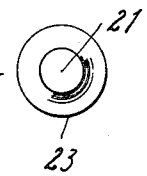
Figure 3:
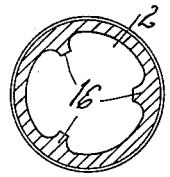
Figure 4:
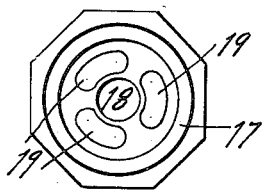

Figure 1 is a side elevation of a faucet which embodies a practical form of my invention, the casing and the other enclosing members being broken away or in section so as clearly to show the parts and members within; Fig. 2, a bottom plan of the relief valve; Fig. 3, a cross section through the wall of the relief chamber, and, Fig. 4, a top plan of the cap for the bottom of said chamber.

Similar reference characters designate similar parts throughout the several views.

I have shown my invention applied to or incorporated with a faucet having a reciprocating valve, and will describe the same as so applied, but it is to be understood that said invention might equally well be applied to or incorporated with a plug or spigot valve, or any other ordinary type of valve.

In Fig. 1 I show a casing 1 which is of ordinary construction, except that it is provided underneath with a chamber 2 at the top of which chamber is a valve-seat 3. The casing 1 has therein an inlet chamber 4 and an outlet chamber 5 connected through a valve-seat 6. A valve-stem 7 has an externally screw-threaded body 8 which engages an internally screw-threaded barrel 9 that is a part of the casing 1. The top of the barrel 9 is closed by means of a screw-cap 10. At the bottom of the valve-stem 7 is a valve 8 which is adapted to close the valve-seat 6, the axis of said stem and the axis of said seat being in line with each other. The valve-stem 7 passes through a packing member 12, a packing-ring 13, and a washer 14. The washer 14 rests on an annular flange at the top of the barrel 9, and the packing-ring 13 rests on said washer and the upper edge of said barrel, and the screw-cap 10 has a shoulder that bears on said ring when said cap is screwed down into place. The packing member 12 fits the space around the valve-stem 7 between the packing-ring 13 and the portion of the screw-cap 10 that is above said ring. The valve-stem 7 is provided at the top with a handle 15.

When the valve-stem 7 is rotated, by means of the handle 15, in the direction to screw the body 8 downwardly in the barrel 9, the valve 11 is carried downwardly into contact with the valve-seat 6, and forced tightly against the same, thus cutting off entirely the flow of water from the inlet chamber 4 to the outlet chamber 5; and, when said valve-stem is rotated in the opposite direction, said body is elevated in said barrel, and said valve is lifted from said seat, so that a clear or free passage for the water is opened between said chambers.

Structurally, except as previously noted, and functionally the parts and members thus far described do not differ materially from corresponding parts and members in other faucets that are of old and well-known construction, and the operation of which is clearly understood.

The valve-seat 3 is in the bottom of the inlet chamber 4, and the wall, which wall is cylindrical, of the chamber 2 depends from said bottom. Within the chamber 2 and integral with the wall thereof is a plurality of vertical guides 16, there being three of such guides in the present example. The inner edges of the guides 16 are in a circle which is concentric with the axis of the valve-seat 3.

A screw-cap 17 is provided for the bottom of the chamber 2 and completes the same, said cap being in threaded engagement with the wall of said chamber and forming a tight joint therewith. In the center of the screw-cap 17 is an opening 18, and there is a plurality of elongated openings 19 in said cap around said first-named opening. There are three of the openings 19 in the present example.

A conical valve 20 is provided for the valve-seat 3, which valve has a stem 21 that is long enough to extend into the central opening 18 in the screw-cap 17 at all times. A spiral-spring 22 encircles the valve-stem 21 between the valve 20 and the bottom of the screw-cap 17, and normally retains said valve in closed position. The major diameter of the valve 20, indicated by the numeral 23, is approximately the same as that of the circle formed in part by the inner edges of the guides 16, consequently said valve is held, centered, and directed by said guides. The valve-stem 21 is held, centered, and guided by the wall of the opening 18. The axis of the valve 20 and its stem coincides with the axis of the valve-seat 3.

The valve 20 and the spiral-spring 22 are placed in position while the screw-cap 17 is disconnected, and then said cap is screwed into place on the bottom of the wall of the chamber 2, to close and complete said chamber, center said stem, and provide a bearing for the lower terminal of said spring. When desired for any reason to obtain access to the chamber 2, the screw-cap 17 is removed, and with it the valve 20. This will be done when the valve-seat 3 needs regrinding.

Normally the spiral-spring 22 retains the valve 20 in tight contact or engagement with the valve-seat 3, so that no water from the chamber 4 can escape through said valve-seat. Normally, therefore, the operation of the faucet is the same as would be the case if the valve-seat 3 were not present. Assuming, however, that, while the valve 11 is closed, the pressure of the water in the chamber 4 becomes greater than the spiral-spring 22 is able to resist, said spring yields under the pressure exerted on the valve 20, and permits said valve to be forced downwardly away from the valve-seat 3. The water then escapes from the chamber 4 through the valve-seat 3 into the chamber 2, and from the latter through the openings 19. As soon as the pressure is reduced to a point which is less than the force of the spiral-spring 22, said spring acts to raise the valve 20 again and cause the same to close the valve-seat 3, when the faucet resumes its functioning under normal conditions.

Usually the faucet is positioned over a sink, into which both the chamber 4 and the chamber 5 open.

Since the valve 20 and its stem 21 are guided by the means and in the manner hereinbefore explained, no difficulty is experienced by the spiral-spring 22 in seating or closing said valve and retaining the same in closed position, in the absence of excessive pressure in the chamber 4, or upon the removal of such pressure.

I am aware that auxiliary valves have been used in connection with screw or plug valves for relief or safety purposes, and do not, therefore, seek to claim broadly such a combination.

What I do claim as my invention, and desire to secure by Letters Patent, is—

1. The combination, in a safety faucet, with a casing having therein inlet and outlet chambers with a valve-seat between, and having a relief chamber beneath said inlet chamber with a valve-seat between, said relief chamber opening through the bottom, of a manually-operated valve for said first-named valve-seat, a valve for said second-named valve-seat, and a spring arranged to retain said last-named valve normally in closed position.

2. The combination, in a safety faucet, with a casing having therein inlet and outlet chambers with a valve-seat between, and having a relief chamber below said inlet chamber with a valve-seat between, said relief chamber opening through the bottom, and being provided with interior guides, of a manually-operated valve for said first-named valve-seat, a valve for said second-named valve-seat, said last-named valve being within said relief chamber and in operative relation to said guides, and provided with a stem which is centered in the bottom of said relief chamber, and a spring arranged normally to retain said valve in closed position.

3. The combination, in a safety faucet, with a casing having therein inlet and outlet chambers with a valve-seat between, and having beneath said inlet chamber a relief chamber with a valve-seat between, said relief chamber opening through the bottom, of a manually-operated valve for said first-named valve-seat, a conical valve for said second-named valve-seat, and a spring arranged to retain said conical valve normally in closed position.

4. The combination, in a safety faucet, with a casing having therein inlet and outlet chambers with a valve-seat between, and having below said inlet chamber a relief chamber with a valve-seat between, and a perforated cap attached to the bottom of the wall of said relief chamber to complete said chamber, of a valve for said first-named valve-seat, a conical valve for said second-named valve-seat, said conical valve having a stem which is received in one of the perforations in said cap, and a spring arranged between said conical valve and said cap to retain the former normally in closed position.

5. The combination, in a safety faucet, with a casing having therein inlet and outlet chambers with a valve-seat between, and having under said inlet chamber a relief chamber with a valve-seat between, said relief chamber consisting in part of a removable perforated cap, and being provided with guides, of a valve for said first-named valve-seat, a conical valve for said second-named valve-seat, said conical valve being in operative engagement with said guides, and provided with a stem that is centered in one of the perforations in said cap, and a spring between said cap and said valve to retain the latter normally in closed position.

PAUL B. WESSON.

Witnesses:
F. A. CUTTER,
R. E. MARTIN.